United States Patent
Yang et al.

(10) Patent No.: US 9,974,031 B2
(45) Date of Patent: May 15, 2018

(54) SPECTRUM SHARING

(71) Applicants: Zeng Yang, Shanghai (CN); Qingshan Zhang, Shanghai (CN); Guoxia Zhang, Shanghai (CN)

(72) Inventors: Zeng Yang, Shanghai (CN); Qingshan Zhang, Shanghai (CN); Guoxia Zhang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days. days.

(21) Appl. No.: 15/110,930

(22) PCT Filed: Feb. 19, 2014

(86) PCT No.: PCT/CN2014/072231
§ 371 (c)(1),
(2) Date: Jul. 11, 2016

(87) PCT Pub. No.: WO2015/123814
PCT Pub. Date: Aug. 27, 2015

(65) Prior Publication Data
US 2016/0337982 A1 Nov. 17, 2016

(51) Int. Cl.
*H04W 40/00* (2009.01)
*H04W 52/24* (2009.01)
(Continued)

(52) U.S. Cl.
CPC .......... *H04W 52/243* (2013.01); *H04L 43/16* (2013.01); *H04W 16/14* (2013.01); *H04W 84/12* (2013.01)

(58) Field of Classification Search
CPC .... H04L 43/16; H04W 52/243; H04W 16/14; H04W 84/12
(Continued)

(56) References Cited

U.S. PATENT DOCUMENTS

| 2004/0047324 A1 | 3/2004 | Diener |
| 2007/0060057 A1* | 3/2007 | Matsuo ............... H04B 1/0475 455/63.1 |

(Continued)

FOREIGN PATENT DOCUMENTS

| CN | 102946639 A | 2/2013 |
| WO | 2011032317 A1 | 3/2011 |
| WO | 2013111103 A2 | 8/2013 |

OTHER PUBLICATIONS

ISA State Intellectual Property Office of the People's Republic of China, International Search Report and Written Opinion Issued in Application No. PCT/CN2014/072231, dated Nov. 26, 2014, WIPO, 12 pages.

(Continued)

*Primary Examiner* — William Nealon
(74) *Attorney, Agent, or Firm* — McCoy Russell LLP (57) ABSTRACT

Communication methods and devices are provided. A communication method includes: a first communication device detecting whether its communications is substantially affected; and if yes, sending a message to a second communication device, whose communication distance is shorter than that of the first communication device, to request the second communication device to decrease its effect on the communications of the first communication device. More reliable solutions for spectrum sharing may be obtained.

16 Claims, 5 Drawing Sheets

(51) Int. Cl.
*H04W 16/14* (2009.01)
*H04L 12/26* (2006.01)
*H04W 84/12* (2009.01)

(58) Field of Classification Search
USPC .......................................................... 455/447
See application file for complete search history.

(56) References Cited

U.S. PATENT DOCUMENTS

| | | | |
|---|---|---|---|
| 2009/0083601 A1* | 3/2009 | Gorokhov | H04L 1/0002 714/748 |
| 2009/0291690 A1* | 11/2009 | Guvenc | H04W 16/10 455/444 |
| 2010/0330918 A1* | 12/2010 | Taghavi Nasrabadi | H04W 72/082 455/63.3 |
| 2011/0299417 A1 | 12/2011 | Nanda et al. | |
| 2012/0142339 A1* | 6/2012 | Duan | H04W 72/08 455/424 |
| 2013/0183904 A1* | 7/2013 | Hiben | H04W 72/082 455/63.1 |

OTHER PUBLICATIONS

European Patent Office, Extended European Search Report Issued in Application No. 14882911.2, dated Sep. 22, 2017, Germany, 8 pages.

* cited by examiner

SPECTRUM SHARING

CROSS REFERENCE TO RELATED APPLICATIONS

The present application is a U.S. National Phase of International Patent Application Serial No. PCT/CN2014/072231, entitled "SPECTRUM SHARING," filed on Feb. 19, 2014, the entire contents of which are hereby incorporated by reference for all purposes.

TECHNICAL FIELD

The present disclosure generally relates to spectrum sharing.

BACKGROUND

Recently need for more efficient usage of wireless communication resources has brought out more scenarios of spectrum sharing. In one conventional spectrum sharing scenario, primary users communicate with each other in a first frequency band based on a first communication technology, secondary users communicate with each other in a second frequency band based on a second communication technology, where the first frequency band and the second frequency band partly overlap with each other. To secure communications of the primary users, the secondary users will reduce their transmission power once they perceive the existence of a primary user.

SUMMARY

In one embodiment, a communication method is provided, the method may include: a first communication device detecting whether its communications are substantially affected; and if yes, sending a message to a second communication device, whose communication distance is shorter than that of the first communication device, to request the second communication device to decrease its effect on the communications of the first communication device.

In some embodiments, the first communication device is based on a first communication protocol, and the second communication device is based on a second communication protocol which is different from the first communication protocol.

In some embodiments, the first communication protocol may be a dedicated short rang communication (DSRC) protocol, and the second communication protocol may be an unlicensed-national information infrastructure (U-NII) protocol.

In some embodiments, the first communication device operates in a first frequency band, and the second communication device operates in a second frequency band, where the first frequency band and the second frequency band have an overlap.

In some embodiments, the message may be sent in the overlapped frequency band.

In some embodiments, the message may be a busy tone.

In some embodiments, the first communication device may repeat the method until it is detected that the communications of the first communication device are not substantially affected.

In some embodiments, detecting whether the communications of the first communication device are substantially affected may include: obtaining magnitudes of subcarriers of a first signal received by the first communication device; and determining whether the communications of the first communication device are substantially affected based on the magnitudes of the subcarriers and a spectral mask of the first communication protocol.

In some embodiments, the method may further include: calculating a feature value representing magnitude difference between the subcarriers; and determining whether the communications of the first communication device are substantially affected based on the feature value and a predetermined threshold which may be calculated based on the spectral mask of the first communication protocol.

In some embodiments, the feature value may represent magnitude difference between subcarriers within a flat region of the spectral mask of the first communication protocol and subcarriers within a declining region of the spectral mask of the first communication protocol.

In some embodiments, the magnitudes of the subcarriers of the first signal may be obtained based on a fast Fourier transform method.

In some embodiments, the magnitudes of the subcarriers of the first signal may be obtained using a filter bank.

In one embodiment, a communication method is provided, the method may include: a first communication device detecting whether a second communication device, whose communication distance is shorter than that of the first communication device, is operating within a frequency band of the first communication device; and if yes, the first communication device sending a message to the second communication device to request the second communication device to decrease its effect on the communications of the first communication device.

In one embodiment, a communication method is provided, the method may include: a first communication device receiving a message from a second communication device whose communication distance is longer than that of the first communication device, where the message is sent by the second communication device to request the first communication device to reduce its effect on communications of the second communication device; and the first communication device reducing its effect on the communications of the second communication device.

In some embodiments, the first communication device is based on a first communication protocol, and the second communication device is based on a second communication protocol which is different from the first communication protocol.

In some embodiments, the first communication protocol may be an unlicensed-national information infrastructure (U-NII) protocol, and the second communication protocol may be a dedicated short rang communication (DSRC) protocol.

In some embodiments, the first communication device operates in a first frequency band, and the second communication device operates in a second frequency band, where the first frequency band and the second frequency band have an overlap.

In some embodiments, the first communication device may receive the message in the overlapped frequency band.

In some embodiments, the message may be a busy tone.

In one embodiment, a first communication device is provided. The first communication device may include a transceiver and a processor. The processor may be configured to: detect whether communications of the first communication device are substantially affected based on signals received by the transceiver; and if yes, control the transceiver to send a message to a second communication device, whose communication distance is shorter than that of the first communication device, to request the second communication device to reduce its effect on the communications of the first communication device.

In some embodiments, the first communication device is based on a first communication protocol, and the second communication device is based on a second communication protocol which is different from the first communication protocol.

In some embodiments, the first communication protocol may be a dedicated short rang communication (DSRC) protocol, and the second communication protocol may be an unlicensed-national information infrastructure (U-NII) protocol.

In some embodiments, the first communication device operates in a first frequency band, and the second communication device operates in a second frequency band, where the first frequency band and the second frequency band have an overlap.

In some embodiments, the transceiver may send the message in the overlapped frequency band.

In some embodiments, the message may be a busy tone.

In some embodiments, the processor may be further configured to: obtain magnitudes of subcarriers of a first signal received by the transceiver; and determine whether the communications of the first communication device are substantially affected based on the magnitudes of the subcarriers and spectral mask of the first communication protocol.

In some embodiments, the processor may be further configured to: calculate a feature value representing magnitude difference between the subcarriers; and determine whether the communications of the first communication device are substantially affected based on the feature value and a predetermined threshold.

In some embodiments, the feature value may represent magnitude difference between subcarriers within a flat region of the spectral mask of the first communication protocol and subcarriers within a declining region of the spectral mask of the first communication protocol.

In some embodiments, the transceiver may include a fast Fourier transformer for transforming the received first signal into frequency domain, and the processor may obtain the magnitudes of the subcarriers of the first signal from the fast Fourier transformer.

In some embodiments, the first communication device may further include a filter bank, and the processor may obtain the magnitudes of the subcarriers of the first signal from the filter bank.

In one embodiment, a first communication device is provided, including a transceiver and a processor. The processor may be configured to: detect whether a second communication device, whose communication distance is shorter than that of the first communication device, is operating within a frequency band of the first communication device based on signals received by the transceiver; and if yes, control the transceiver to send a message to the second communication device to request the second communication device to decrease its effect on the communications of the first communication device.

In one embodiment, a first communication device is provided. The first communication device may include a transceiver and a processor which may be configured to: when a message is received by the transceiver from a second communication device whose communication distance is longer than that of the first communication device, control the first communication device to reduce its effect on communications of the second communication device, where the message is sent by the second communication device to request the first communication device to reduce its effect on the communications of the second communication device.

In some embodiments, the first communication device is based on a first communication protocol, and the second communication device is based on a second communication protocol which is different from the first communication protocol.

In some embodiments, the first communication protocol may be an unlicensed-national information infrastructure (U-NII) protocol, and the second communication protocol may be a dedicated short rang communication (DSRC) protocol.

In some embodiments, the first communication device operates in a first frequency band, and the second communication device operates in a second frequency band, where the first frequency band and the second frequency band have an overlap.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Nowadays, there are more and more spectrum sharing scenarios. For example, in USA, unlicensed-national information infrastructure (U-NII) communications will be authorized to operate in a frequency band ranging from 5850 MHz to 5925 MHz, which has already been assigned to dedicated short rang communications (DSRC). That is to say, U-NII signals and DSRC signals may be transmitted in overlapped frequency bands. However, compared with U-NII communications, DSRC should be preferential in an overlapped frequency band to ensure vehicular safety applications. In following descriptions, embodiments for implementing co-existence of U-NII communication and DSRC will be illustrated in detail. However, it should be noted that the present disclosure is not limited to embodiments disclosed hereinafter. Extensions to other spectrum sharing scenarios could be easily conceived in light of the disclosure.

Figure 1:
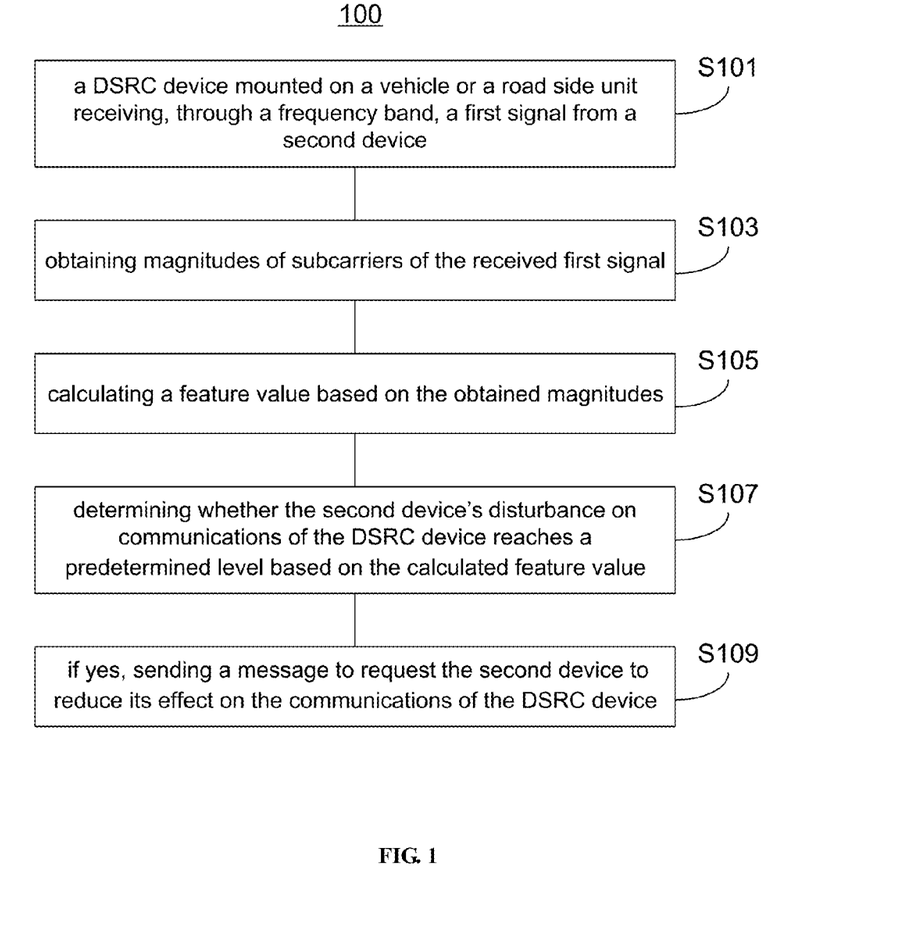
FIG. 1 schematically illustrates a communication method according to one embodiment.

FIG. 1 schematically illustrates a communication method 100 according to one embodiment. Referring to FIG. 1, in S101, a DSRC device mounted on a vehicle or a road side unit receiving, through a frequency band, a first signal from a second device.

The DSRC device may be configured to operate in a particular frequency band ranging from 5850 MHz to 5925 MHz, in which other types of signals, such as U-NII signals, may be transmitted. As a result, the first signal received by the DSRC device may be a DSRC signal or a U-NII signal.

If the DSRC device receives a DSRC signal, it could be concluded that, at least at the present time window, there is no signal conflicting exists, or in other words, there is no interference source can harm communications of the DSRC device.

If the DSRC device receives a U-NII signal, it could be concluded that the second device is a U-NII device and the DSRC device is be located in a transmission range of the U-NII device. As a result, communications of the DSRC device may be substantially affected. In signal co-existence scenarios, there are primary users and secondary users. Communications between the primary users should be preferentially guaranteed, compared with communications between the secondary users. In the co-existence of DSRC and U-NII signals, DSRC signals may have a priority for using the frequency band source, since vehicle safety communications are apparently more important than common U-NII communications. To guarantee that, the second device should reduce its effect on the communications of the DSRC device. For example, the second device may reduce its transmission power or stop using the frequency band. Therefore, detecting whether the communications of the DSRC device is substantially affected may be implemented.

In S103, obtaining magnitudes of subcarriers of the received first signal.

DSRC signals and U-NII signals are based on different communication protocols, so their subcarrier magnitudes may have different distribution characters. Therefore, in some embodiments, whether the communications of the DSRC device is substantially affected may be detected based on the magnitudes of the subcarriers of the received first signal.

The subcarrier magnitudes of the received first signal may be obtained in various ways. Normally, the DSRC device may include a DSRC chip for communicating DSRC signals, and the subcarrier magnitude may be obtained from the DSRC chip.

Figure 2:
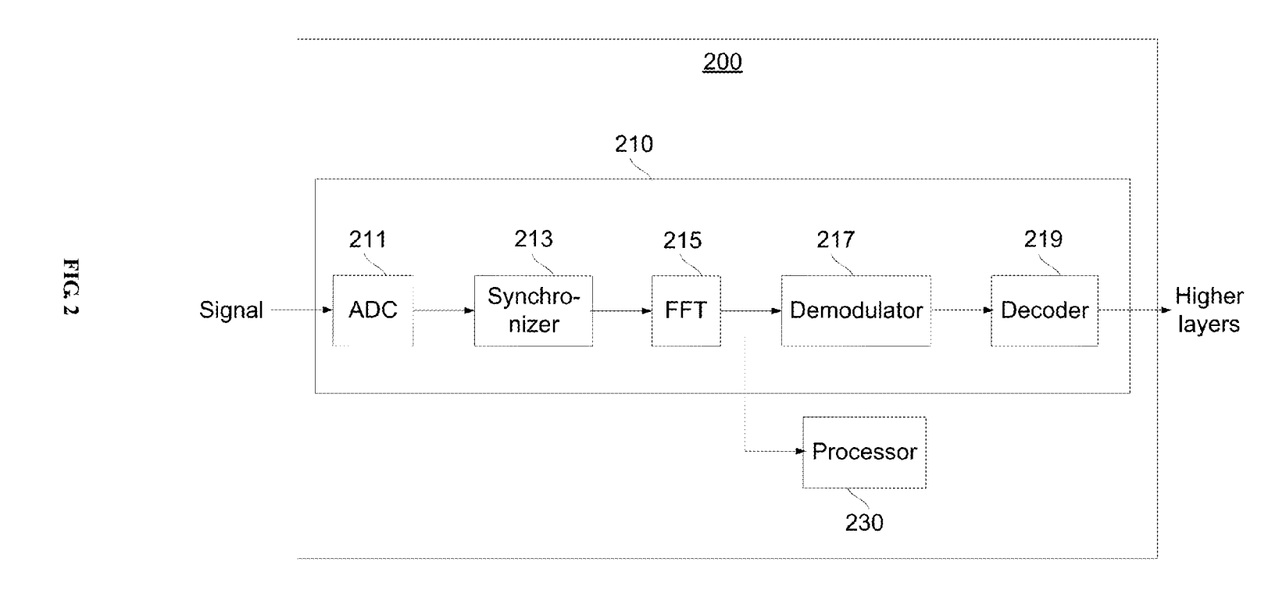
FIG. 2 illustrates a schematic block diagram of a DSRC device 200 according to one embodiment.

FIG. 2 illustrates a schematic block diagram of a DSRC device 200 according to one embodiment. The DSRC device 200 may include a DSRC chip 210 and a processor 230. The DSRC device 200 may be embedded in an onboard control system of a vehicle or embedded in a road side unit.

For receiving signals, the DSRC chip 210 may include an analogue-to-digital converter (ADC) 211, a synchronizer 213, a fast Fourier transformer (FFT) 215, a demodulator 217 and a decoder 219. An analogue signal received by the DSRC device 200 may be converted into a digital signal in time domain by the ADC 211. Then after the synchronizer 213 and the FFT 215, the time domain signal may be transformed into a frequency domain signal, such that spectrum of the received signal can be obtained. If the frequency domain signal could be demodulated and decoded by the demodulator 217 and the decoder 219, information contained in the received signal may be sent to higher layers, such as an application layer, for further processing. If the received signal is not a DSRC signal, the frequency domain signal can't be successively demodulated and decoded by the demodulator 217 and the decoder 219, and the received signal may be discarded.

Based on the above description, it could be concluded that, no matter which type the first signal is, the magnitudes of subcarriers thereof may be obtained after the fast Fourier transformation, since its spectrum can be obtained. As such, the processor 230 may obtain the magnitude values from the FFT 215, which is very convenient and requires almost no hardware modification. In some embodiments, the processor 230 may be a processor of the onboard control system or the road side unit.

In some embodiments, a bank filter may be embedded in the DSRC device 200. The bank filter may obtain the time domain signal from the synchronizer 213 and obtain the magnitudes of subcarriers of the signal using a filtering method. Thereafter, the processor 230 may obtain the magnitudes from the filter bank.

The processor 230 may implement following processing based on the obtained magnitudes.

In S105, calculating a feature value based on the obtained magnitudes.

Protocols relating to DSRC are stipulated in IEEE 802.11p, while protocols relating to U-NII communications are written in IEEE 802.11ac. As IEEE 802.11ac supports a wider bandwidth than IEEE 802.11p, spectrum characteristics of U-NII signals and DSRC signals may be different.

Figure 3:
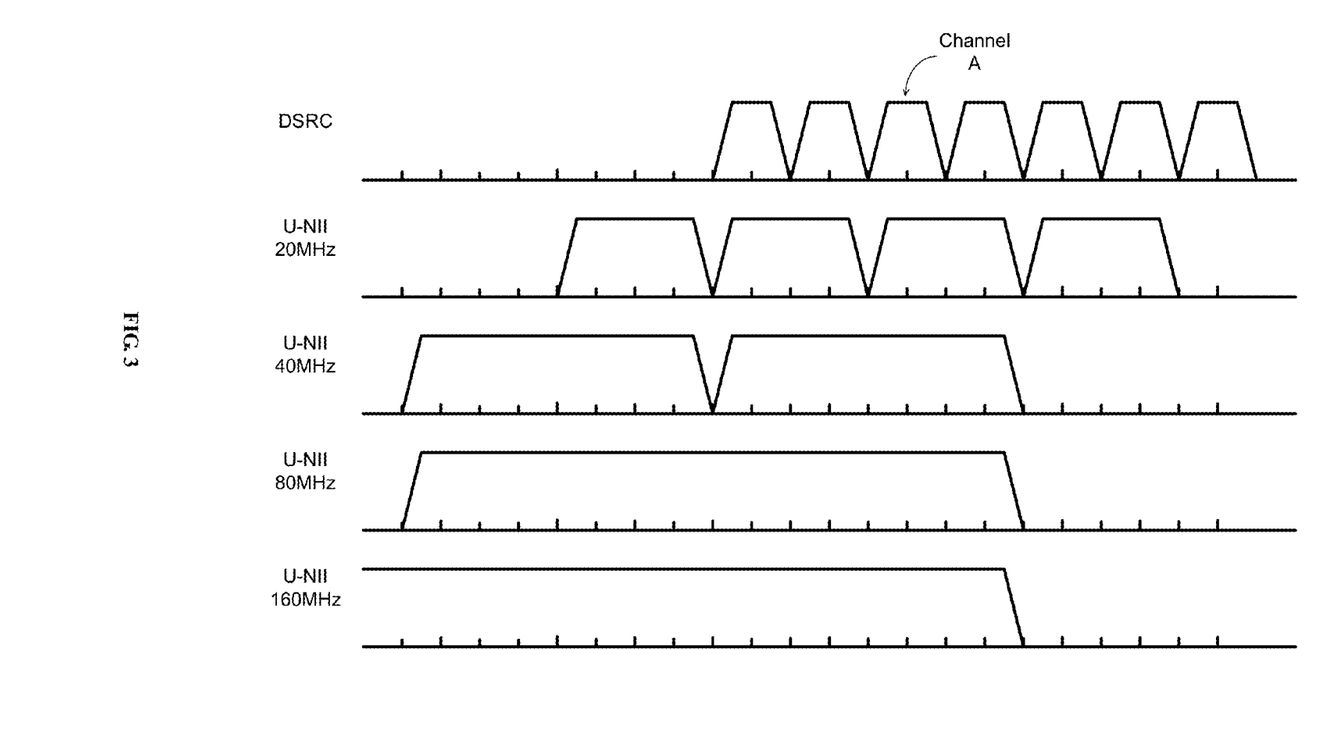
FIG. 3 schematically illustrates a band plan for DSRC and U-NII communications.

FIG. 3 schematically illustrates a band plan for DSRC and U-NII communications, in which U-NII communications may have four bandwidths, 20 MHz, 40 MHz, 80 MHz and 160 MHz. Blocks illustrated in FIG. 3 represent both channel bands and spectral mask profiles of DSRC signals and U-NII signals. It could be seen from FIG. 3 that the channel bands of U-NII signals may partly or completely overlap with or adjacent to the channel bands of DSRC signals. As a result, signal conflicting occurs. However, spectral mask profiles corresponding to particular frequency values may be different between DSRC signals and U-NII signals, which can be used to distinguish them apart.

For example, suppose the DSRC device may receive signals in a channel A, which may be preset and won't change unless frequency hopping happens. If the received first signal is a DSRC signal, it should conform to the spectral mask of the channel A, vice versa. That is to say, if the received first signal is a DSRC signal, it should have relatively high subcarrier magnitudes in a flat region of the spectral mask of the channel A, and have relatively low subcarrier magnitudes in a declining region of the spectral mask of the channel A. Besides, difference between the high magnitudes and low magnitudes should be constrained in a specific range. However, if the received first signal is a U-NII signal, the magnitudes of subcarriers within the flat region and the declining region of the DSRC spectral mask would not show such characteristics. Therefore, in some embodiments, the feature value may represent magnitude difference between subcarriers having particular frequency values, which particular frequency values may be determined based on the spectral mask of DSRC protocols.

Specifically, a first set of frequency values and a second set of frequency values may be predetermined, which may be respectively located within the flat region and declining region of the spectral mask of the channel A. Thereafter, magnitudes of subcarriers having the predetermined frequency values may be extracted and also divided into two groups based on their frequency values. The feature value may represent difference between the two groups.

In some embodiments, the feature value may be calculated based on the following equation:

$$U = \frac{\sum_j \sum_i |C_{ij}|}{NM} - \frac{\sum_j \sum_I |C_{Ij}|}{NP}$$

where U stands for the feature value, N denotes the number of time domain OFDM symbols in the received first signal, M denotes the number of a first group of subcarriers within the flat region, P denotes the number of a second group of subcarriers within the declining region, j denotes time domain OFDM symbol index, i denotes frequency domain subcarrier index of the first group, and I denotes to frequency domain subcarrier index of the second group.

It should be noted that the feature value may be calculated in other ways, as long as the calculated feature value may dispose in different ranges respectively corresponding to U-NII signals and DSRC signals.

In S107, determining whether the second device's disturbance on communications of the DSRC device reaches a predetermined level based on the calculated feature value.

Figure 4:
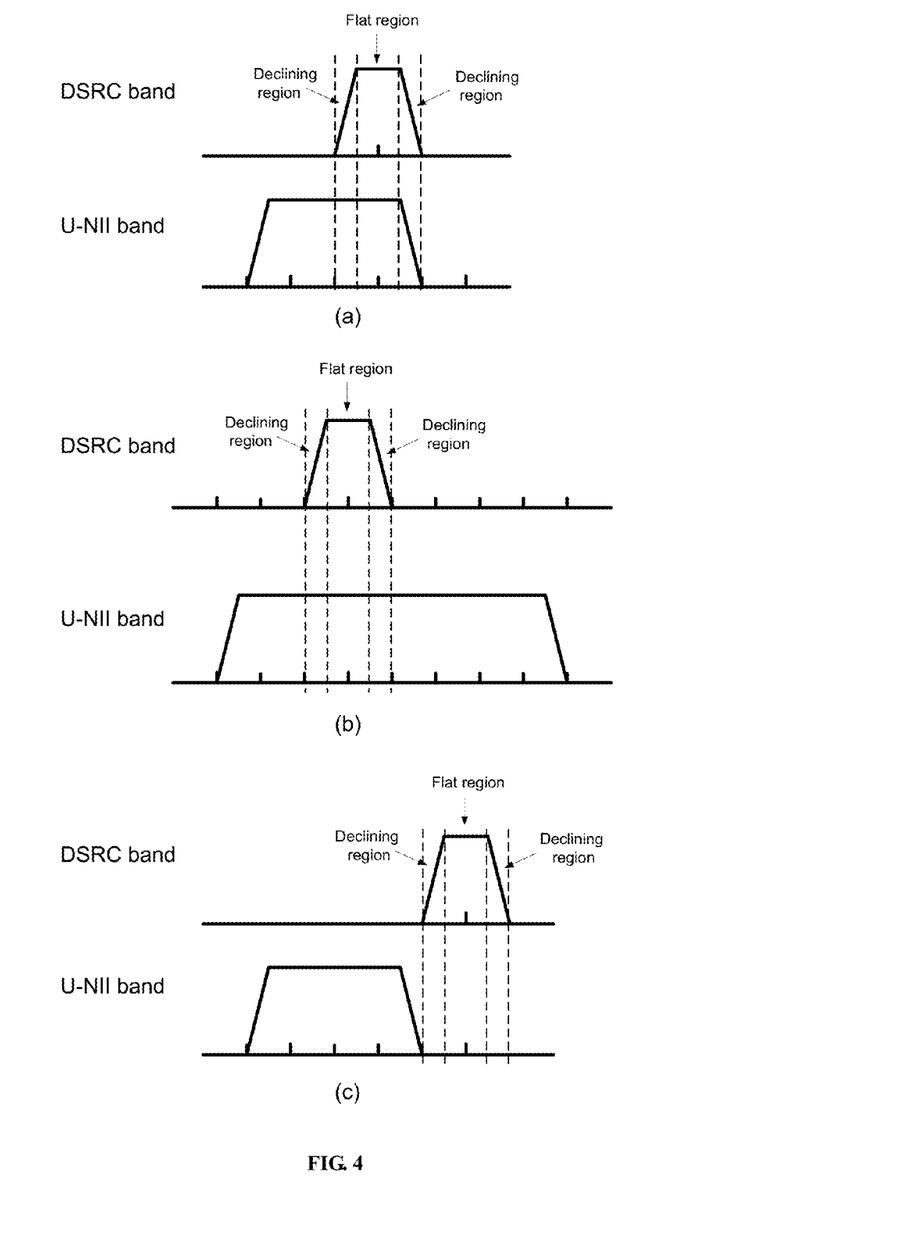
FIG. 4 schematically illustrates three spectrum sharing scenarios.

FIG. 4 schematically illustrates three spectrum sharing scenarios. In scenario (a), the U-NII band may overlap with the DSRC band, and the two bands may have a same edge point on one side. In scenario (b), the U-NII band may completely overlap the DSRC band. And in scenario (c), the U-NII band may be adjacent to the DSRC block. It could be understood that, in either scenario, the feature value of the U-NII signal representing subcarrier magnitude difference between the flat region and the declining region may be relatively small. In conclusion, when the calculated feature value is relatively small, it is more possible that the received first signal is a U-NII signal, which means the communications of the DSRC device could be substantially affected. When the calculated feature value is relatively large, it is more possible that the received first signal is a DSRC signal, which means the second device won't disturb the communications of the DSRC device.

In some embodiments, a threshold value may be set based on the spectral mask of the DSRC protocol. If the calculated feature value is less than the threshold value, it may be determined that the second device's disturbance on communications of the DSRC device reaches a predetermined level. If the calculated feature value is greater than or equal to the threshold value, it may be determined that the second device's disturbance on communications of the DSRC device doesn't reach the predetermined level.

Setting the threshold value may be a trade off between false alarm rate and missing alarm rate. In some embodiments, the threshold value may be 3 dB.

In S109, if yes, sending a message to request the second device to reduce its effect on the communications of the DSRC device.

To secure usage of the frequency band for the primary user, i.e., the DSRC device, the second device should reduce its effect on the communications of the DSRC device, for example, by reducing its transmission power or stopping using the frequency band, such that the DSRC device may be disposed out of the transmission range of the second device and receive no U-NII signals from the second device anymore.

The DSRC device may broadcast the message. Referring back to FIG. 2, in some embodiments, the processor 230 may be configured to generate the message, and control the DSRC chip 210 or other communication device mounted on the vehicle to send the message. If the second device receives the message, it may negotiate to reduce its transmission power or stop using the frequency band accordingly. Some protocols may be defined in the second device, such that it may perform the required processing. In some embodiments, the message may be a busy tone, which is commonly used in the art for indicating failure or collision. The message may be sent immediately in the present time window or after a short time period (e.g., short inter-frame space) when the time window is over.

Figure 5:
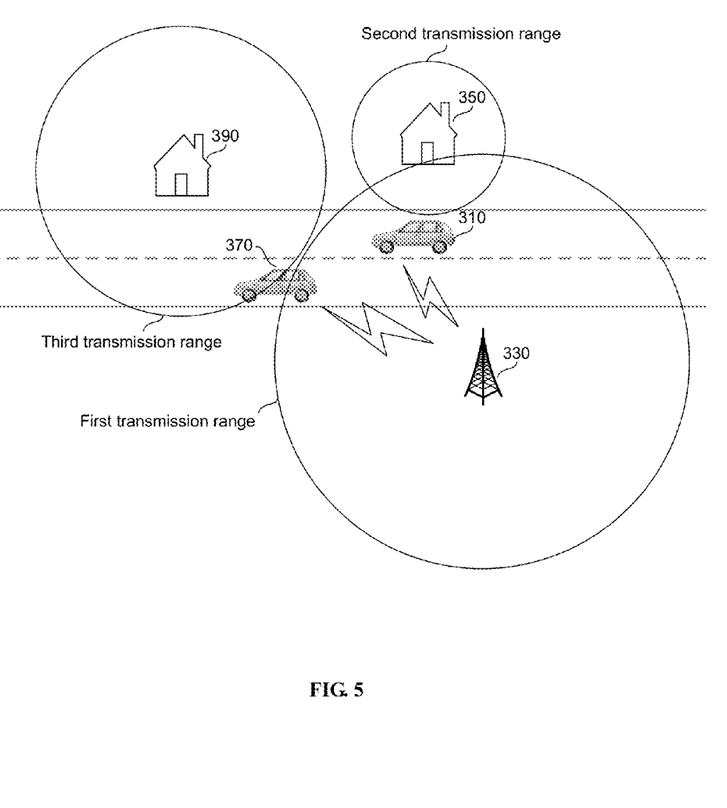
FIG. 5 schematically illustrates possible scenarios where signal conflicting may exist.

FIG. 5 schematically illustrates possible scenarios where signal conflicting may exist.

Referring to FIG. 5, a DSRC device 310 mounted on a vehicle may be disposed in a first transmission range of a DSRC road side unit (RSU) 330 and out of a second transmission range of a U-NII device 350 in a house beside a road, and the first transmission range may overlap with the second transmission range. In such scenario, the U-NII device 350 can detect energy of signal transmitted by the RSU 330 while the signal of its own may not harm the DSRC device 310, that is because DSRC may have a communication distance longer than that of U-NII communication. From the angle of the U-NII device 350, signal conflicting exists. However, since whether signal conflicting exists is determined by the DSRC device 310, no busy tone may be sent. Therefore, the U-NII device 350 can maintain its transmission power to fully use the spectrum source.

Referring still to FIG. 5, a DSRC device 370 mounted on another vehicle may be disposed in both the first transmission range of the RSU 330 and a third transmission range of a U-NII device 390 in another house beside the road, and the third transmission range may not overlap with the first transmission range. In such scenario, the U-NII device 390 can't detect energy of signal transmitted by the RSU 330 while the signal of its own may harm the DSRC device 370. From the angle of the U-NII device 390, signal conflicting doesn't exist. However, since whether signal conflicting exists is determined by the DSRC device 370, a busy tone may be sent to the U-NII device 390. Therefore, the U-NII device 390 may reduce its transmission power to avoid disturbing the primary user.

Based on above descriptions about FIG. 5, it could be concluded that, if the primary user in a frequency band has a longer communication distance than the secondary user, implementing signal conflict detection from the primary user side may achieve a more reliable solution for spectrum sharing.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A communication method, comprising:
   a first communication device detecting whether its communications are substantially affected; and
   responsive to detecting that the communications of the first communication device are substantially affected, sending, with the first communication device, a message to a second communication device, whose communication distance is shorter than that of the first communication device, to request the second communication device to decrease its effect on the communications of the first communication device,
   wherein the first communication device is based on a first communication protocol and the second communication device is based on a second communication protocol which is different from the first communication protocol, and
   wherein the first communication device processes data according to the first communication protocol, the second communication device processes data according to the second communication protocol, and the first and second communication protocols are associated with different spectral mask profiles from one another.

2. The communication method according to claim 1, where the first communication protocol is a dedicated short range communication (DSRC) protocol, and the second communication protocol is an unlicensed-national information infrastructure (U-NII) protocol.

3. The communication method according to claim 1, where the first communication device operates in a first frequency band, and the second communication device operates in a second frequency band, where the first frequency band and the second frequency band have an overlap.

4. The communication method according to claim 3, wherein the message is sent in the overlapped frequency band.

5. The communication method according to claim 1, wherein detecting whether the communications of the first communication device are substantially affected comprises:
   obtaining magnitudes of subcarriers of a first signal received by the first communication device; and
   determining whether the communications of the first communication device are substantially affected based on the magnitudes of the subcarriers and a spectral mask of the first communication protocol.

6. The communication method according to claim 5, further comprising:
   calculating a feature value representing a magnitude difference between the subcarriers; and
   determining whether the communications of the first communication device are substantially affected based on the feature value and a predetermined threshold which is calculated based on the spectral mask.

7. The communication method according to claim 6, where the feature value represents a magnitude difference between subcarriers within a flat region of the spectral mask of the first communication protocol and subcarriers within a declining region of the spectral mask of the first communication protocol.

8. A communication method, comprising:
   a first communication device receiving a message from a second communication device whose communication distance is longer than that of the first communication device, where the message is sent by the second communication device to request the first communication device to reduce its effect on communications of the second communication device; and
   the first communication device reducing its effect on the communications of the second communication device,
   wherein the first communication device is based on a first communication protocol and the second communication device is based on a second communication protocol which is different from the first communication protocol, and
   wherein the first communication device processes data according to the first communication protocol, the second communication device processes data according to the second communication protocol, and the first and second communication protocols are associated with different spectral mask profiles from one another.

9. A first communication device, comprising a transceiver and a processor, where the processor is configured to:
   detect whether communications of the first communication device are substantially affected based on signals received by the transceiver; and
   responsive to detecting that the communications of the first communication device are substantially affected, control the transceiver to send a message to a second communication device, whose communication distance is shorter than that of the first communication device, to request the second communication device to reduce its effect on the communications of the first communication device,
   wherein the first communication device is based on a first communication protocol and the second communication device is based on a second communication protocol which is different from the first communication protocol, and
   wherein the first communication device processes data according to the first communication protocol, the second communication device processes data according to the second communication protocol, and the first and second communication protocols are associated with different spectral mask profiles from one another.

10. The first communication device according to claim 9, where the first communication protocol is a dedicated short range communication (DSRC) protocol, and the second communication protocol is an unlicensed-national information infrastructure (U-NII) protocol.

11. The first communication device according to claim 9, where the first communication device operates in a first frequency band, and the second communication device operates in a second frequency band, where the first frequency band and the second frequency band have an overlap.

12. The first communication device according to claim 11, wherein the transceiver sends the message in the overlapped frequency band.

13. The first communication device according to claim 9, wherein the processor is configured to:
    obtain magnitudes of subcarriers of a first signal received by the transceiver; and
    determine whether the communications of the first communication device are substantially affected based on the magnitudes of the subcarriers and a spectral mask of the first communication protocol.

14. The first communication device according to claim 13, wherein the processor is further configured to:
    calculate a feature value representing a magnitude difference between the subcarriers; and determine whether the communications of the first communication device are substantially affected based on the feature value and a predetermined threshold calculated based on the spectral mask.

15. The first communication device according to claim 14, wherein the feature value represents a magnitude difference between subcarriers within a flat region of the spectral mask of the first communication protocol and subcarriers within a declining region of the spectral mask of the first communication protocol.

16. A first communication device, comprising a transceiver and a processor which is configured to:
when a message is received by the transceiver from a second communication device whose communication distance is longer than that of the first communication device, control the first communication device to reduce its effect on communications of the second communication device, where the message is sent by the second communication device to request the first communication device to reduce its effect on the communications of the second communication device, wherein the first communication device is based on a first communication protocol and the second communication device is based on a second communication protocol which is different from the first communication protocol, and wherein the first communication device processes data according to the first communication protocol, where the second communication device processes data according to the second communication protocol, and wherein the first and second communication protocols are associated with different spectral mask profiles from one another.

* * * * *